United States Patent [19]
Kawata et al.

[11] Patent Number: 5,875,033
[45] Date of Patent: *Feb. 23, 1999

[54] SHEET SIZE DETECTING APPARATUS RESPONSIVE TO A CONVEYING SPEED OF THE SHEET

[75] Inventors: Wataru Kawata, Tokyo; Akimaro Yoshida, Yokohama, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 535,664

[22] Filed: Sep. 28, 1995

[30] Foreign Application Priority Data

Sep. 30, 1994 [JP] Japan .................................... 6-261335

[51] Int. Cl.⁶ ............................... H04N 1/23; H04N 1/40
[52] U.S. Cl. ............................................. 358/296; 358/449
[58] Field of Search .................................... 358/296, 449, 358/471, 474, 486, 488, 494, 496, 498; 399/376, 386, 389

[56] References Cited

U.S. PATENT DOCUMENTS

| | | | |
|---|---|---|---|
| 4,992,827 | 2/1991 | Kobayashi et al. ..................... | 355/202 |
| 5,018,714 | 5/1991 | Honjo et al. .............................. | 271/3.1 |
| 5,119,145 | 6/1992 | Honjo et al. ............................. | 355/308 |
| 5,132,741 | 7/1992 | Kitajima et al. ........................ | 355/313 |
| 5,148,221 | 9/1992 | Gokita .................................... | 355/246 |
| 5,291,225 | 3/1994 | Saito ....................................... | 399/376 |
| 5,510,908 | 4/1996 | Watanabe et al. ....................... | 358/448 |
| 5,568,573 | 10/1996 | Wada et al. .......................... | 358/449 X |

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

A sheet size detecting apparatus includes a rotary member for conveying a sheet rotation detector together with the rotary member for generating a pulse, a sheet size measurement control device including an arm provided in a vicinity of the rotary member to effect reciprocally rocking by the passing of the front end and the rear end of the sheet. The sheet size measurement control device measures the size of the sheet by counting pulses generated by the rotation detector means in response to the rocking of the arm and, adds a correction value to the measured sheet size according to the conveying speed of the sheet.

35 Claims, 15 Drawing Sheets

SHEET SIZE DETECTING APPARATUS RESPONSIVE TO A CONVEYING SPEED OF THE SHEET

BACKGROUND OF THE INVENTION

1. Field of the Invention

The present invention relates to a sheet size detecting apparatus or an automatic original feeding apparatus adapted for use in an image forming apparatus such as a copying machine or a laser beam printer. More particularly it relates to an automatic original feeding apparatus provided with original size detecting means for detecting the original size by detecting the leading and trailing ends of the original in the course of conveyance, and also to an image forming apparatus equipped with such automatic original feeding device.

2. Related Background Art

In the conventional automatic original feeding apparatus for automatically feeding originals to a reading unit of an image forming apparatus such as a copying apparatus, the original supplied from an original stacker is transported to and fixed at the reading position, by a conveyor belt capable of forward and reverse rotation, and, after the image reading by a reciprocating motion of a light source (reading means), it is discharged by the conveyor belt onto the original stacker. In this operation, the discharged original is transported to the original stacker from a side same as that of entry of the original to the reading position. The above-mentioned original fixing method with switch-back motion of the original requires a time for interchanging the originals after image reading, and a faster transporting speed of the originals, if employed for increasing the image reading speed, will result in drawbacks such as noise and mechanical shocks.

In contrast to the original reading by the original fixing method explained above, there is proposed a flow reading method in which the reading means is fixed and the original is read in the course of flowing motion thereof. Because of the configuration of the original stacker, this flow reading method is applied for reading small-sized originals such as B5 or A4 size, and the originals on the original stacker are supplied to the original flow position from a side opposite to the side of feeding in the above-mentioned switch-back feeding. The supplied original is discharged to the original stacker through a closed path (CP) constituting a closed loop, and the original is read by the fixed flow means in the course of conveyance through said path.

In such closed-path feeding, the stack of the originals on the original stacker is pushed to the other end portion (closed path feeding portion) of said stacker by a shutter (moving means). Also on the closed-path feeding portion of the original stacker there is provided an original rear end sensor for detecting a large-sized original when it is placed on the stacker, and the original is fed from the side of the switch-back path when said sensor is activated.

The size of the original on the original stacker is detected, by bringing a pair of lateral plates for defining the lateral position of the originals into contact with the lateral edges of the original, by size sensors linked with said lateral plates.

In case of closed-path feeding of the original, it is conveyed with one of at least two conveying speed, i.e. a flow reading mode speed V1 and a fixed reading mode speed V2. In the closed convey path, there is provided a detecting switch for generating signals indicating the starting and ending times of the detection of the original size detection means. Said detecting switch is provided with an arm which crosses the original convey path and is rotated by the leading and trailing ends of the conveyed original to activate the detecting switch, and the detection time of the original size detecting means is controlled by the on/off operation of said switch to detect the original size.

In the conventional configuration explained above, however, the original size detection means for detecting the size of the original passing through the closed convey path has a mechanical lever to be rotated by the leading and trailing ends of said original as the actuator for the detecting switch, so that, although the switch turn-off time is constant by the returning rotation of said lever in response to the passing of the trailing end of the original, the moving amount of said trailing end after passing the original varies depending on the conveying speed of the original.

SUMMARY OF THE INVENTION

The object of the present invention is to provide a sheet size detecting apparatus for detecting the sheet size by detecting the front and rear ends of a sheet member passing through a transport path and measuring-the amount of rotation, within the detected period, of a pair of rollers serving to transport the sheet member, capable of exactly detecting the sheet size even when the transporting speed of the sheet member is varied.

It is also the object of the present invention to provide an automatic original feeder equipped with such sheet size detecting apparatus, and an image forming apparatus provided with such automatic original feeder.

The above-mentioned object can be attained, according to the present invention, by a sheet size detecting apparatus comprising size detection means having an arm crossing the convey path of the sheet member and adapted to detect the sheet size based on the actuation time of a switch actuated by the contact of said arm with the sheet member, and convey means for conveying the sheet member with at least two different speeds, wherein the switch actuation time in said size detection means is corrected, based on said conveying speed.

Also said original conveying means is provided with a flow reading mode in which the reading means is fixed and the sheet member is moved relative to said reading means, and a consecutive feed mode in which the sheet member is fixed at a reading position and said reading means is moved relative to said sheet member. Also said original conveying means is provided, in the flow reading mode in which the reading means is fixed and the sheet member is moved relative to said reading means, with at least two different conveying speeds for the sheet member.

Also there is provided automatic original feeding apparatus comprising:

elevator means for vertically shifting a sheet stacker to a lifted position or a lowered position; and sheet transporting means including:

an endless belt for conveying the sheet member to a reading position on a platen;

a switch-back path for conveying the sheet member on said sheet stacker to said endless belt, then conveying said sheet member to said reading position by said endless belt and reversing said endless belt to discharge said sheet member onto said sheet stacker; and a closed path for conveying the sheet member on said sheet stacker to said endless belt and further conveying said sheet member, by the rotation of said endless belt in one direction only, through said reading position onto said sheet stacker.

Wherein said sheet stacker is adapted, in the lifted position thereof, to feed said sheet member from an end of the sheet stacker to a feed/separation portion of said switch-back path, and, in said lowered position, to feed said sheet member from the other end of the sheet stacker to a feed/separation portion of said closed path; and sheet conveying means in said closed path is adapted to convey the sheet member in different speeds and includes the original size detection means mentioned above.

In the above-mentioned configuration, the front and rear ends of the conveyed sheet member are detected by on/off operations of a detecting switch, caused by the lever thereof extending into the convey path. The sheet size is detected by the sheet size detection means, based on the actuation times of said detecting switch. The size detected by the sheet size detection means is corrected according to the conveying speed of the sheet member. Thus the sheet size can be properly measured even under various conveying speeds of the sheet member in the convey path.

DESCRIPTION OF THE PREFERRED EMBODIMENTS

In the following there will be explained an embodiment of the present invention with reference to the attached drawings.

Figure 2:
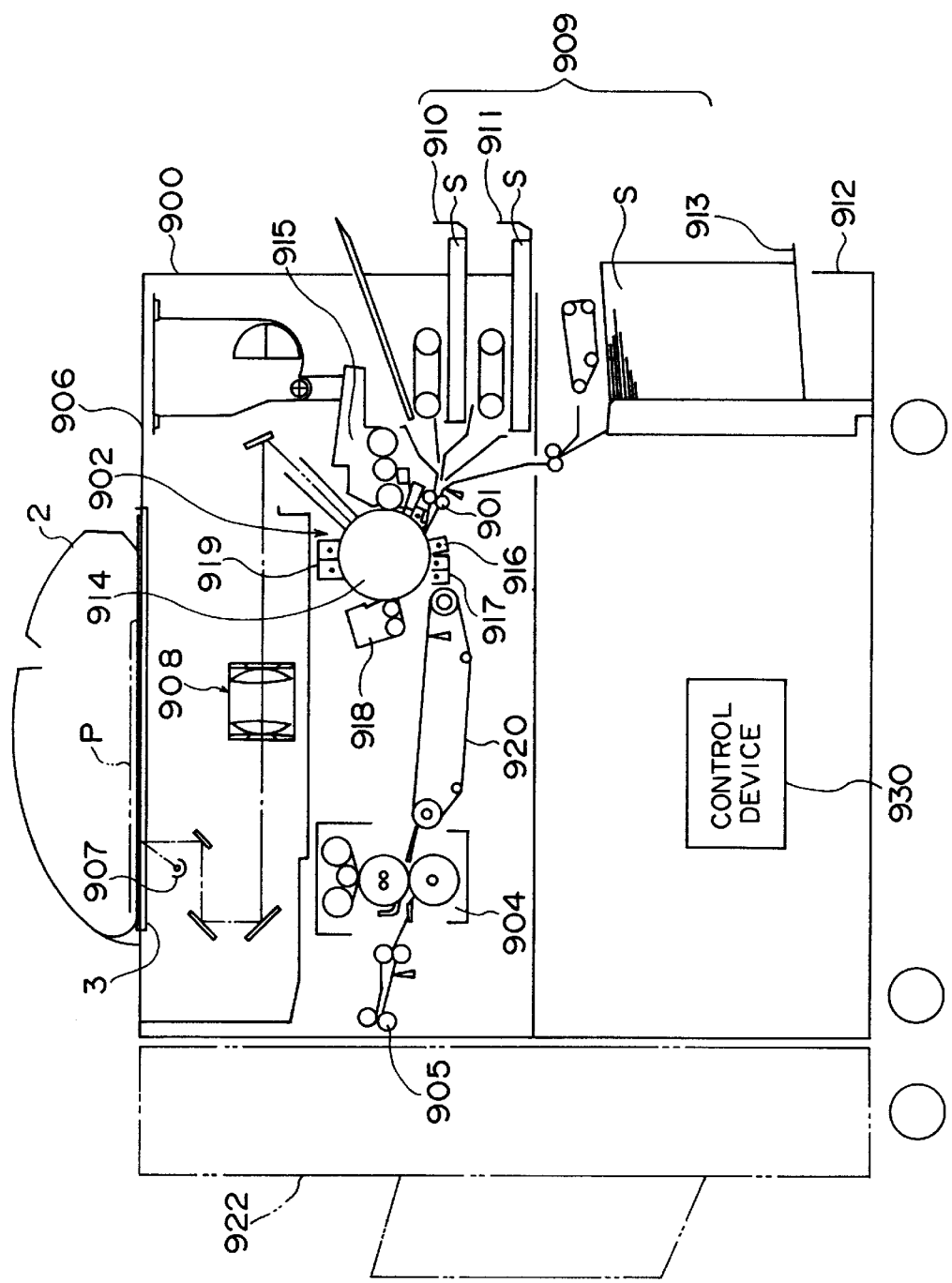
FIG. 2 is a longitudinal cross-sectional view of an image forming apparatus in which the automatic original feeding apparatus is applicable.

Referring to FIG. 2 showing an image forming apparatus in which the automatic original feeding apparatus of the present invention is applicable, a main body 900 of a copying apparatus is provided with a platen glass 3 constituting an original reading unit, a light source (reading means) 907, a lens system 908, a sheet feeding unit 909 and an image forming unit 902. Originals P are supplied one by one to said platen glass 3 by-means of an automatic original feeding apparatus 2.

The sheet feeding unit 909 is provided with cassettes 910, 911 containing sheet member and detachably mounted on the main body 900, and a deck 913 provided on a pedestal 912. The image forming unit 902 is provided with a cylindrical photosensitive drum 914, a developing unit 915, a transfer charger 916, a separation charger 917, a cleaner 918, a primary charger 919 etc. At the downstream side of the image forming unit 902 there are provided a conveying device 920, a fixing device 904, discharge rollers 905 etc. Discharged sheets are sorted by a sheet sorting device 922. The main body 900 is provided with a control device (CPU) 930.

The above-explained image forming apparatus functions in the following manner.

In response to a sheet feed signal from the control apparatus 930 of the main body 900, a sheet member S is fed from the cassette 910 or 911 or the deck 913. On the other hand, the light directed from the light source 907 to the original P placed on the platen glass 3 and reflected thereby irradiates the photosensitive drum 914 through the optical system 908. The photosensitive drum 914 is charged in advance by the primary charger 919, and an electrostatic latent image is formed by the irradiation with said light, and is then developed into a toner image by the developing unit 915.

The sheet member S fed from the sheet feeding unit 909 is subjected to the correction of skewed advancement and adjusted in timing in the registration rollers 910 and supplied to the image forming unit 902, in which thus supplied sheet member S receives the transfer of the toner image from the photosensitive drum 914 by the transfer charger 916 and is then separated from the photosensitive drum 914 by the separation charger 917 of a polarity opposite to that of the transfer charger 916.

The sheet member S thus separated is transported by the conveyor 920 to the fixing apparatus 904, in which the transferred image is permanently fixed to the sheet member S. After the image fixation, the sheet member S is discharged by the discharge rollers 905 from the main body 900. In this manner the sheet member S fed from the sheet feeding unit 909 is discharged with an image formed thereon.

In the following there will be explained the automatic original feeding device of the present invention.

Figure 1:
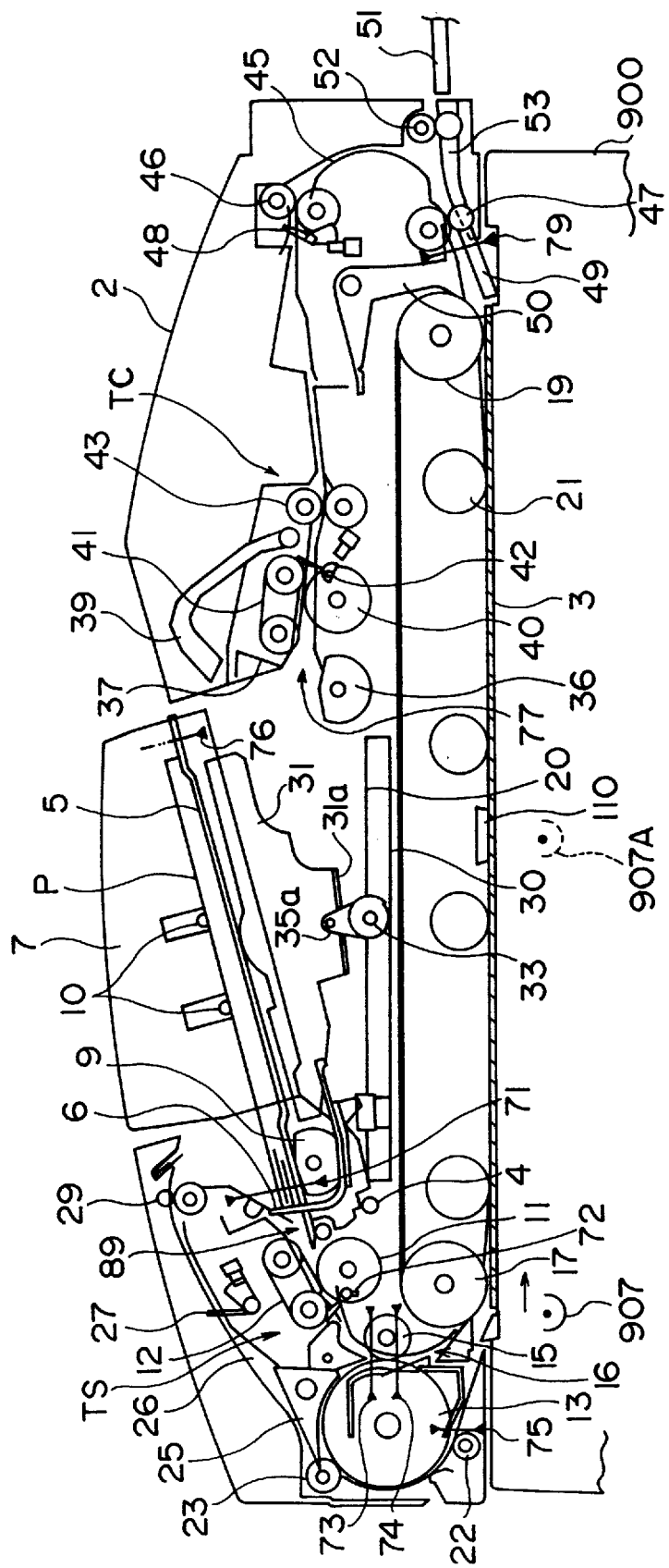
FIG. 1 is a longitudinal cross-sectional view of an automatic original feeding apparatus of the present invention.

Now referring to FIG. 1, which is a longitudinal cross-sectional view of the automatic original feeding apparatus, a conveyor (endless) belt 20 capable of forward and reverse rotation is supported by a driving roller 17 and an idler roller 19, on the platen glass 3 of the main body 900.

On the original stacker 5, there are placed plural originals P, which are aligned in the lateral direction by a pair of lateral defining plates 7. A recycle lever 10 placed on the originals P serves to separate the originals P before feeding from those already fed and discharged onto the original stacker 5. A shutter (moving means) 6 receives and aligns the front ends of the originals P and is retracted below the original stacker 5 at the original feeding. A semicircular feeding roller 9 is rotated at the original feeding, thereby advancing the lowermost one of the originals P.

At the downstream side of the feed roller 9 there is provided a separation unit consisting of a transporting roller 11 rotated in the feeding direction of the original and a separating belt 12 rotated in the reverse direction, whereby the originals P advanced by the feed roller 9 are separated and conveyed one by one. At the further downstream side there is provided a pair registration rollers comprising of an inverting driving roller 13 and an idler roller 15 maintained in contact therewith, for feeding the original P onto the platen glass 3 at a predetermined timing. The original P is conveyed by a conveyor belt 20 onto the platen glass 3 and stopped at a predetermined position, and the image on said original is read, while it is stopped, by the movement of the light source 907 in a direction indicated by an arrow.

A first transport path 16 is constituted by a path including the separation unit 11, 12 and the registration rollers 13, 15 mentioned above, and a switch-back path TS for feeding the original P to the image reading position and discharging the same in a switch-back manner is constituted by said first transport path 16, the conveyor belt 20 and a discharge path 26.

After the fixed image reading, the original P is transported, by reverse rotation of the conveyor belt 20, to a flapper 25 through an external transport path. The flapper 25 inverts the original P and guides it to the platen glass 3 in case of reading both sides of the original P, but guides the original P to discharge rollers 29 through a discharge path 26 in case of reading one side only of the original P. A sensor 27 is provided for detecting the original P passing through the discharge path 26. The original P discharged by the discharge rollers 29 is placed on the unfed original P on the original stacker, separated from the latter by the recycle lever 10.

The original stacker 5 is rendered rotatable about a shaft 4, as will be explained later, between an inclined position shown in FIG. 1 and a horizontal position shown in FIG. 3. In the inclined position shown in FIG. 1, the original P is fed to the platen glass 3 through the first convey path 16 as explained in the foregoing, but, in the horizontal position shown in FIG. 3, it is conveyed, from the rear end thereof, to the platen glass 3 through a second convey path 45.

A closed path TC, for conveying the original P to the reading position and discharging the same from said reading position in a closed loop is constituted by said second convey path 45, the conveyor belt 20 and the discharge path 26. Also original convey means TS, TC, 20 is constituted by said switch-back path TS, the conveyor belt 20 and said closed path TC.

Said original conveying means TS, TC, 20 is provided with a flow reading mode in which the light source (reading means) 907A is fixed and the original is moved thereto, and a consecutive feeding mode in which the original is fixed at the reading position and the light source 907A is moved thereto, and is further provided with at least two different transporting speeds for the originals. Wherein the conveying speed V1 at the flow reading mode is smaller than that V2 at the consecutive feeding mode.

Also the original conveying means in the closed path TC is capable of conveying the original with different speeds and is provided with CP registration motor/encoder (original size detecting means) 109b for detecting the size of the conveyed original and detected original size correcting means 170. A feeding unit 77 sends the original P fed by the feed roller 36 to the original conveying means TS, TC, 20.

Also at the rear end side of the original stacker 5, there are provided components similar to those explained above, including a guide plate 37, a semicircular feed roller 36, a weight 39 for pressing the original P to the feed roller 36, a convey roller 40 rotating in the conveying direction of the document and a separating belt 41 rotating in the reverse direction. At the downstream side of the separation unit, comprising of the convey roller 40 and the separating belt 41, of the closed path, there is provided a second convey path 45 for conveying the original P, after separation, to the reading position on the platen glass 3. In said second convey path 45, there are provided paired convey rollers 43, a registration sensor 48, paired registration rollers 46 and paired feed rollers 47.

Between the upper one of said paired feed rollers 47 and a second roller 19 of the conveyor belt 20, there is provided a movable guide member 50 for guiding the original P to or from the platen glass 3. There are also provided a manual feed tray 51 for manually feeding the original P into the automatic original feeding device 2, a feed roller 52 for the manually fed original, and guide plates 53, 49 for the manually fed original.

In the following discussion there will be explained the function of the shutter 6 and the original stacker 5 at the feeding of the original P.

Figure 6:
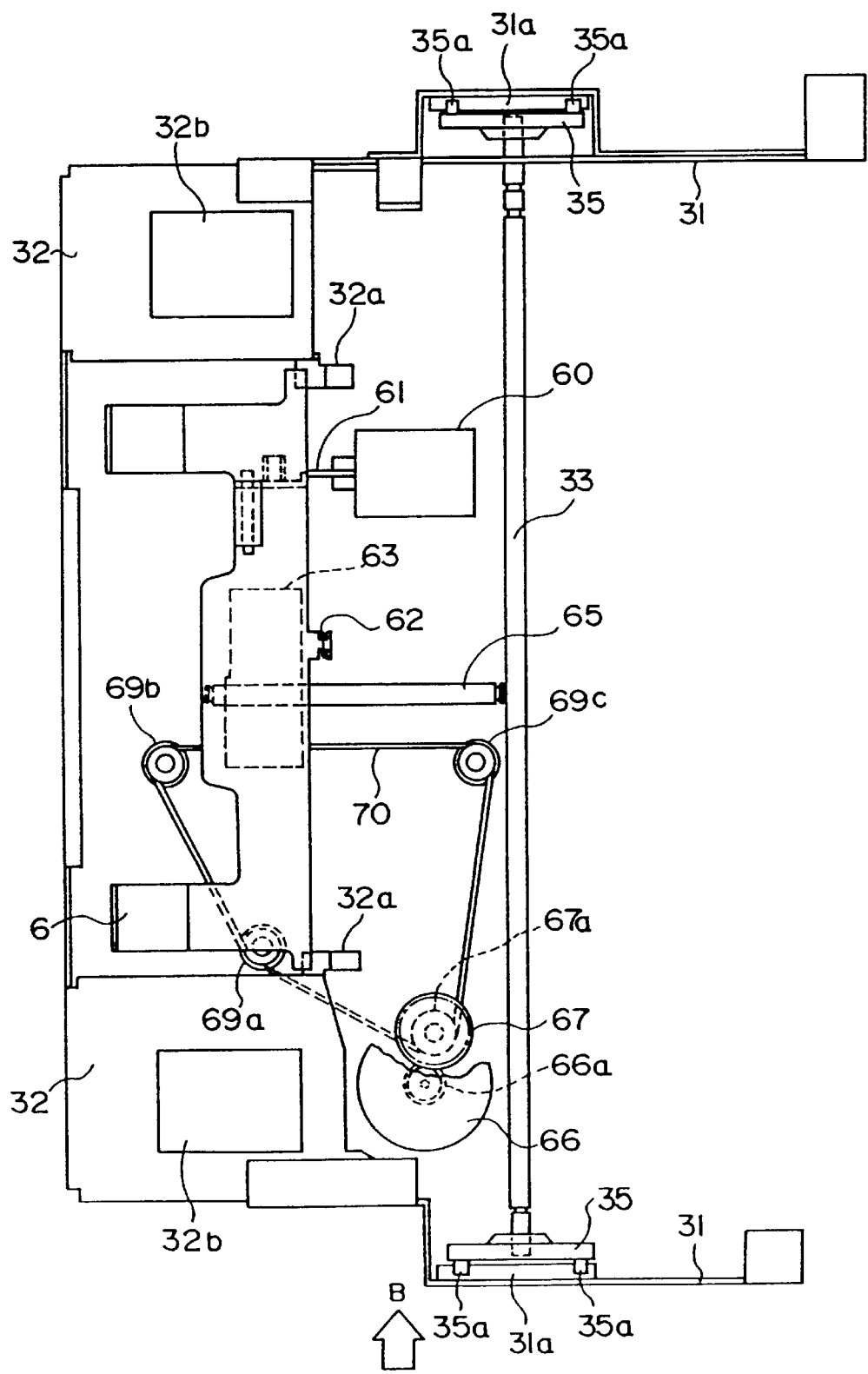
FIG. 6 is a plan view of the shutter unit and a driving unit therefor.

Referring to FIGS. 4A to 4C, 5A to 5C and 6, a frame 31 and a support member 32 integral therewith are provided on each side of the original stacker 5, and said support member 32 is rendered rotatable about a shaft 4. A folded portion 31a formed on the frame 31 is adapted to descend, when pressed by a driving pin 35a formed at a free end of a driving member (elevator means) 35. Said driving member 35 is fixed at each end of a connecting shaft 35 and is rotated by a driving source such as a motor. The driving member 35 and said driving source constitute an elevator device for vertically moving the original stacker 5. A hole 32b shown in FIG. 6 is provided for allowing the feed roller 9 to extend upwards when it is rotated.

Figure 4A:
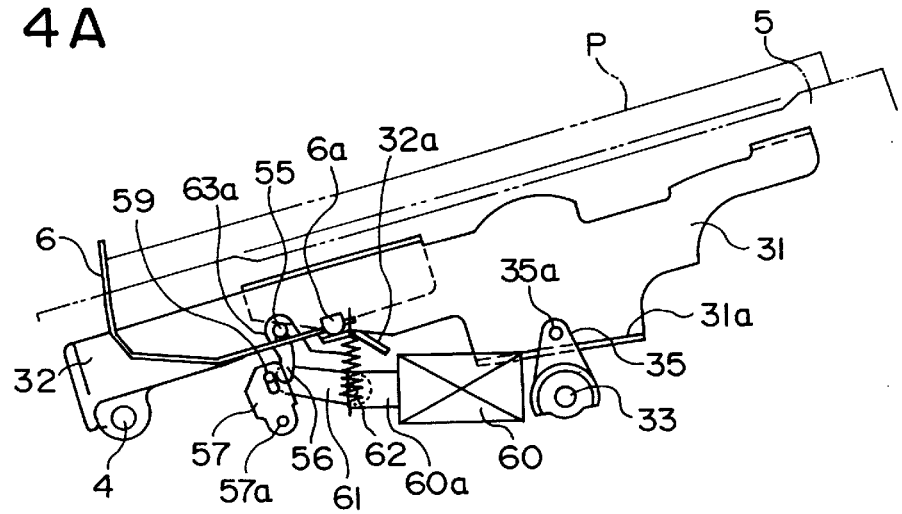
FIG. 4A is a lateral view of a shutter unit and a sheet stacker in the sheet feeding from a switch-back path.
Figure 4B:
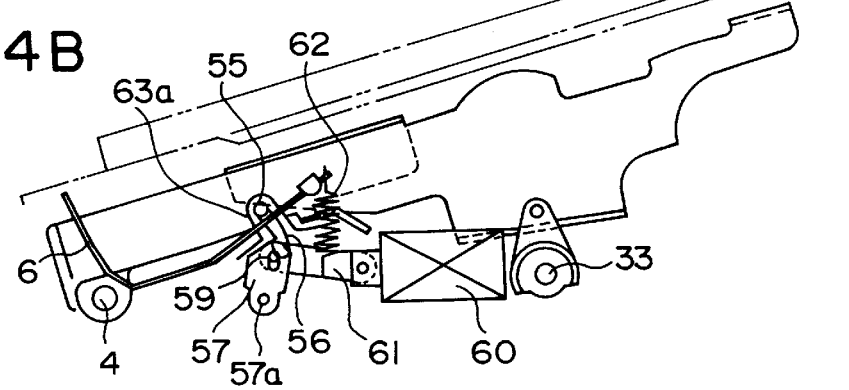
FIG. 4B is a view showing the function of the apparatus shown in FIG. 4A
Figure 4C:
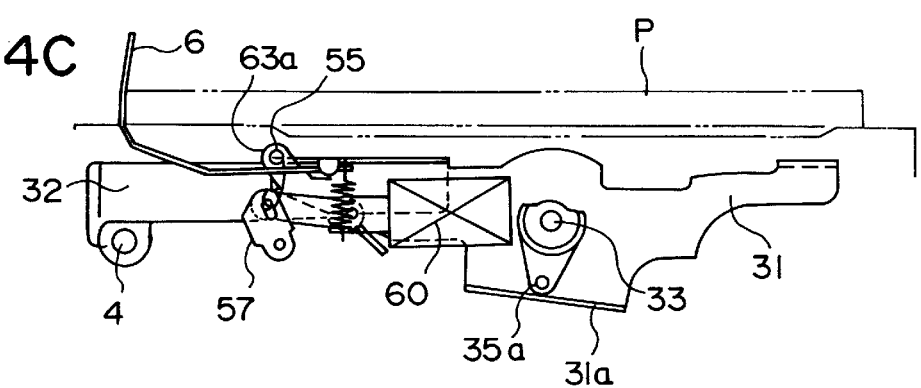
FIG. 4C is a lateral view of the shutter unit and the sheet stacker in the sheet feeding from a closed path.
Figure 5A:
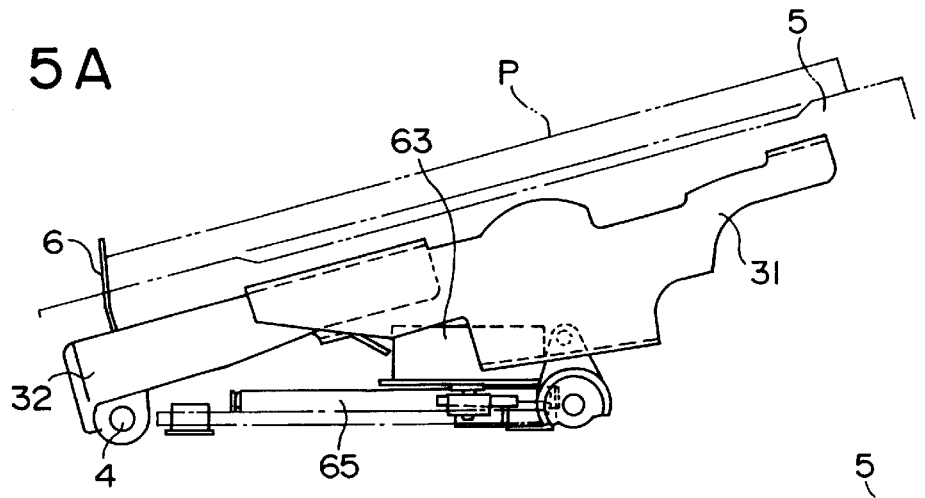
FIG. 5A is a lateral view of a shutter unit and a sheet stacker in the sheet feeding from a switch-back path and FIGS. 5B and 5C are views showing the function of the apparatus shown in FIG. 5A.
Figure 5B:
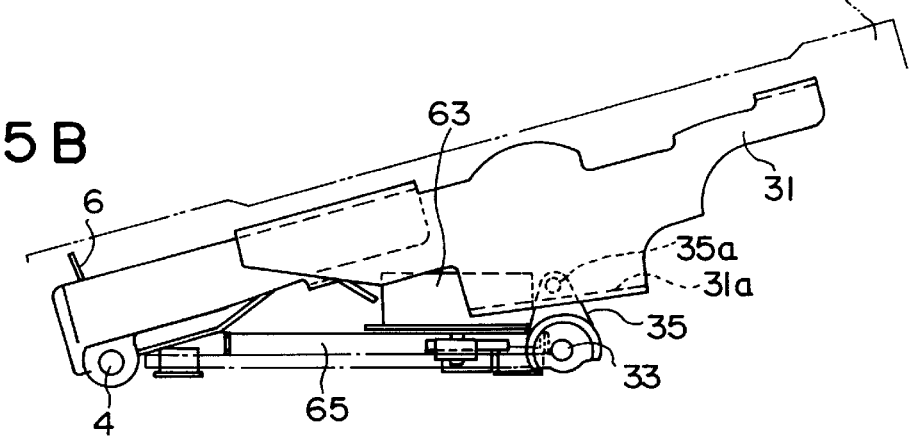
Figure 5C:
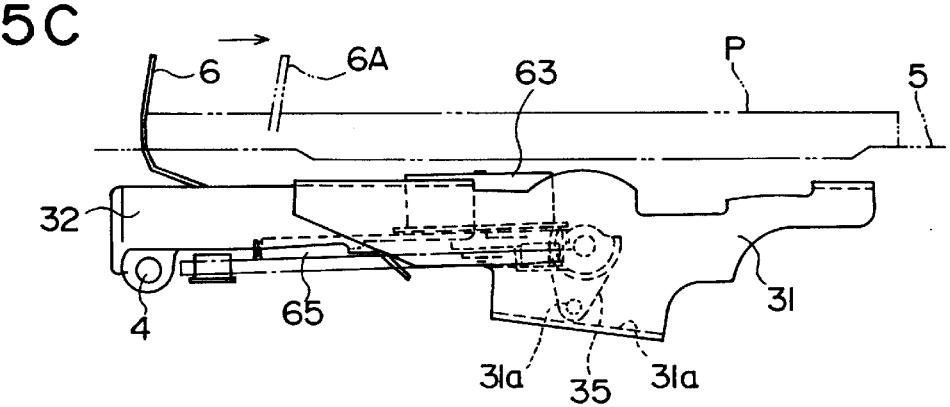

In case of feeding the originals P from the rear end side (for achieving high-speed running reading), the above-mentioned driving member 35 is rotated to cause the driving pin 35a to depress the folded portion 31a of the frame 31, whereby the original stacker 5 is rotated from the inclined state shown in FIG. 4A to the horizontal state shown in FIG. 4C.

Again referring to FIGS. 4A to 4C, a shaft 55 integral with the shutter 6 is rotatably mounted on a support portion 63a integral with a block 63 (cf. FIG. 6). A solenoid 60 is provided for driving the shutter 6. An actuator member 60a of said solenoid is articulated to an end of a link member 61, of which the other end is provided with a pin 59, engaging with an elongated hole formed on the free end of the arm 57 rendered rotatable about a shaft 57a.

The pin 59 faces the lower end portion of a driven member 56 of which free end is fixed to said shaft 55. The shutter 6 is biased clockwise in FIGS. 4A to 4C, namely in a direction to extend from the original stacker 5, by a tension spring 62 of which ends engage with the shutter and the link member 61.

In case of conveying the original P from the original stacker 5 through the first convey path 16 (for fixed image reading for making plural copies), the shutter 6 functions as an ordinary shutter, with a smaller protruding amount from the original stacker 5 as shown in FIG. 4A. When the solenoid 60 is energized by a sheet feeding start signal from the control device 930 (FIG. 2), the arm 57 rotates clockwise in FIG. 4A, whereby the driving member 56 is pushed by the pin 59 and rotates anticlockwise in FIG. 4B. At the same time the shutter 6 integral with the arm 57 rotates in the same direction and is retracted from the upper face of the original stacker 5 as shown in FIG. 4B. By the rotation of the feed roller 9 in this state, several of the originals P are advanced to the separating unit 11, 12.

Now referring to FIGS. 5A to 5C and 6, the block 63 supporting the shutter 6 is movably supported by a guide shaft 65. A guide member 32a guides the shutter 6 by engaging with protruding portions 6a on both ends of the shutter 6, when it returns to the illustrated original position. In the state shown in FIG. 4A, the protruding portions 6a are in contact with the guide member 32a by the force of the tension spring 62.

A stepping motor (stack moving motor) 66 serves to move the shutter 6 along the upper face of the original stacker 5. A gear 66a fixed on the output shaft of said motor 66 meshes with a pulley gear 67, and a belt 70 is provided around a pulley 67a of said pulley gear 67 and other plural pulleys 69a, 69b, 69c, and is fixed in a part to the block 63. Thus, the shutter 6 moves in the longitudinal direction of the original stacker 5 when the motor 66 rotates according to the length of the original P.

On the other hand, in case of feeding the original P from the rear end side to the second convey path 45, the original stacker 5 is moved to the horizontal state shown in FIG. 4C, while the shutter 6 is retained in the position shown in FIG. 4A. The downward rotation of the guide member 32a of the support member 32 integral with the original stacker 5 causes the protruding portions 6a of the shutter 6, maintained in contact therewith, to rotate in the same direction (clockwise in FIGS. 4A to 4C). As a result, the shutter 6 rotates clockwise relative to the original stacker 5, whereby the shutter 6 protrudes by a larger amount as shown in FIG. 4C. In this state the shutter 6 is moved toward the second feed roller 36 by the motor 66, whereby the stack of the originals P is moved and rendered feedable by the second feed roller and the second separating unit 40, 41 to the second transport path 45 (cf. FIGS. 5A to 5C).

Thus, when the shutter 6 is used as the stack moving means, it is made to protrude by a larger amount, whereby the front ends of the originals P placed on the original stacker 5 can securely engage with the shutter 6 even if said originals are curled and the stack of said originals P can be stably moved.

The original P fed by the second feed roller 36 and separated by the separating unit 40, 41 is conveyed through the second convey path 45 to the reading position on the platen glass 3, then is subjected to flow reading, while being conveyed by the conveyor belt 20, by the light source 907A stopped at a predetermined position, and is discharged onto the original stacker 5 through the discharge path 26.

Referring to FIG. 1, the light source 907A constituting the reading means is moved to a predetermined position in case of flow reading of the original P. Above said light source 907A, the lateral edges of the conveyor belt 20 are pressed to the platen glass 3 by a pair of pressing members 110. Thus, even if the lateral edge portions of the conveyor belt 20 have ripples after prolonged use, there can be prevented defective reading resulting from the flapping of the lateral edge portions of the original P.

Figure 7A:
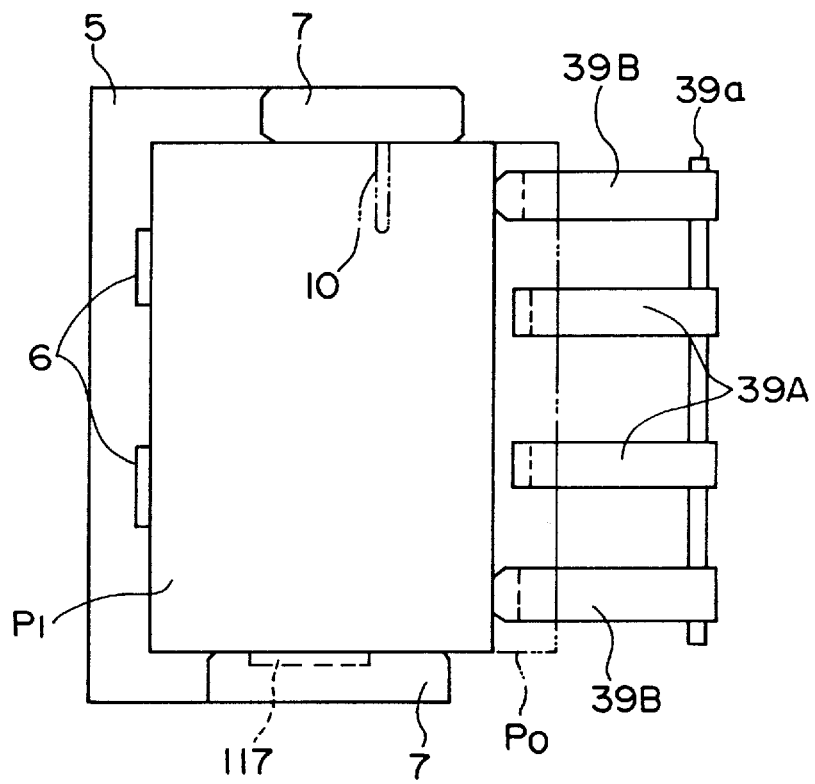
FIG. 7A is a plan view of a sheet stacker and a weight unit and FIG. 7B is a lateral view thereof.
Figure 7B:
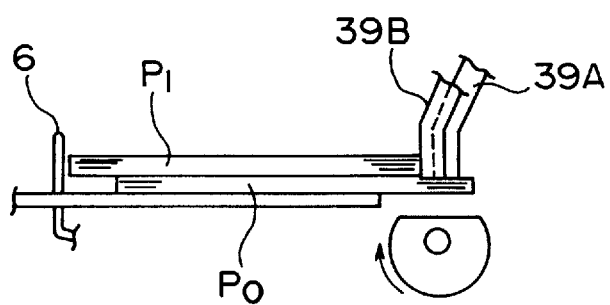

FIGS. 7A and 7B show the shutter 6 and a weight 39 for pressing and dividing the stack of the originals P pushed by said shutter 6. Referring to FIG. 7A, the originals P on the original stacker 5 are defined in position by a pair of manually adjusted lateral plates 7, and are aligned in the transversal (Y) direction by vibrating motion, in said transversal direction, of a jogging member 117 provided in one of the lateral plates 7.

The weight 39 is comprised of a pressing member 39A rotatably mounted at a base portion thereof on a shaft and rendered vertically movable so as to press the unfed originals $P_0$ to the feed roller 36, and a partition member 39B fixed at a base portion thereof to a shaft 39a and adapted to limit, as shown in FIG. 7B, the ends of the originals $P_1$ after a cycle of feeding from the original stacker 5 and discharge thereonto.

Figure 8:
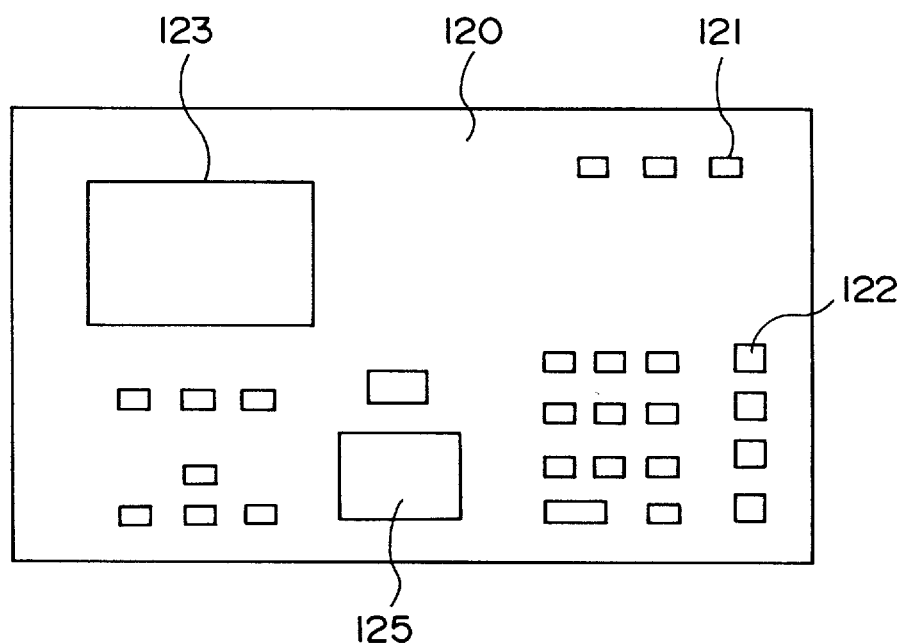
FIG. 8 is a plan view of an operation panel.

FIG. 8 illustrates an operation panel 120 for the main body 900 of the copying apparatus and the automatic original feeding apparatus 2, wherein shown are a start button 125, a stop key 121 for stopping the feeding of the originals P, and a flow reading adjustment key 122.

Figure 9:
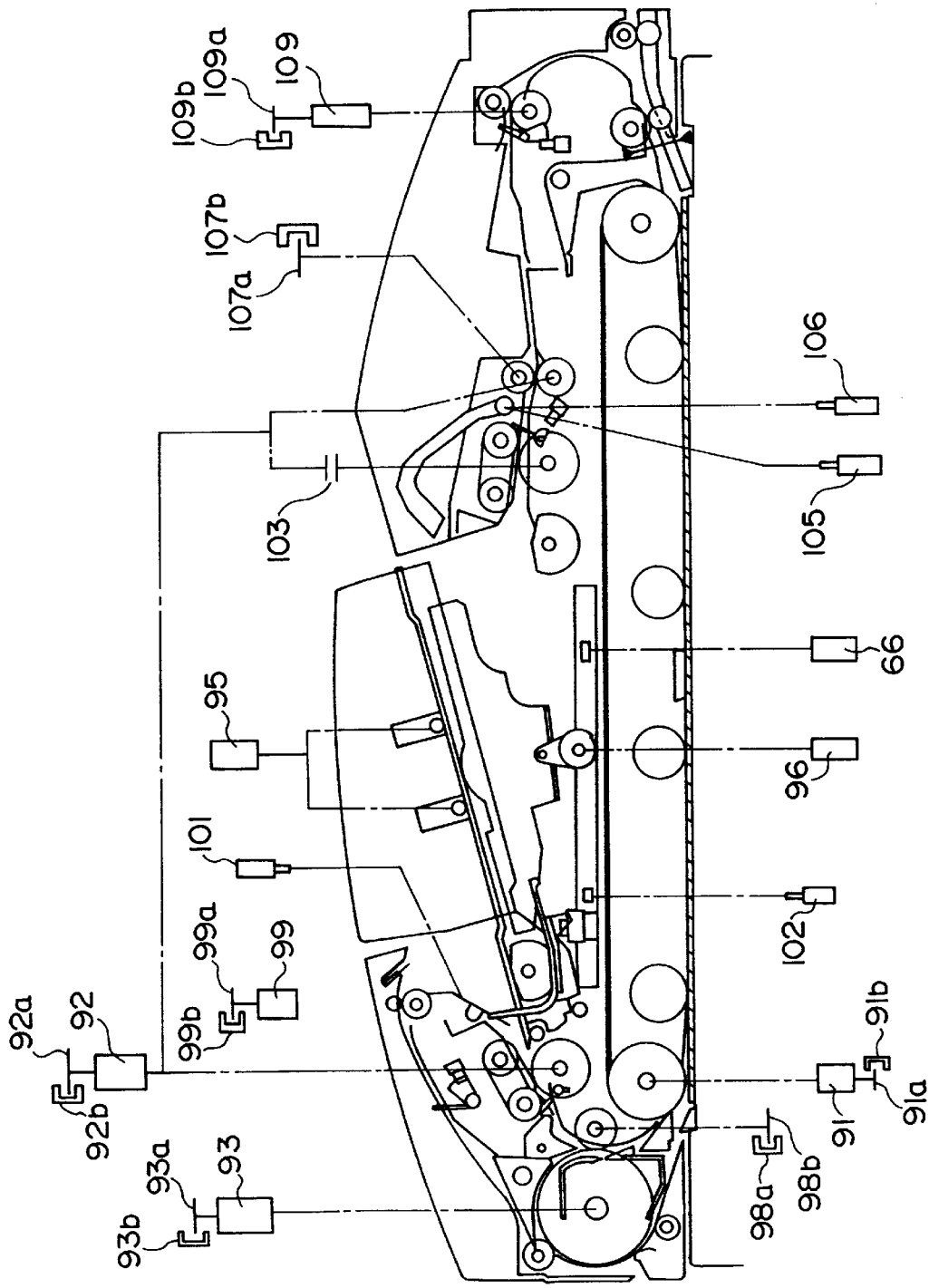
FIG. 9 is a longitudinal cross-sectional view of a driving system of the automatic original feeding apparatus.

FIG. 9 illustrates a driving system of the automatic original feeding apparatus, wherein shown are a recycle motor 95 for driving the recycle lever 10 for dividing the unfed originals P and the already recycled original originals P; a weight solenoid 101 for vertically moving the pressing member 39A; a separating motor 92; a separating motor encoder 92b; a clutch 103 for transmitting the rotation of the separating motor 92 to the separating unit 40, 41; a belt motor 91 for driving the conveyor belt 20; a separating motor encoder 91b; an inversion motor 93 for driving the inversion roller 13; an inversion motor encoder 93b; an idler roller encoder 98a of the registration rollers 13, 15; a sheet discharging motor 99 for driving the discharge rollers 29; a discharge motor encoder 99b; a stack convey motor 66 for moving the shutter 6; a tray motor 102 for vertically moving the original stacker 5; a partition solenoid 105 for vertically moving the partition member 39B; a weight solenoid 106 for vertically moving the pressing member 39A; a convey roller encoder 107b; a CP registration motor 109 for driving the registration rollers 46; and a CP registration motor encoder 109b.

Figure 10:
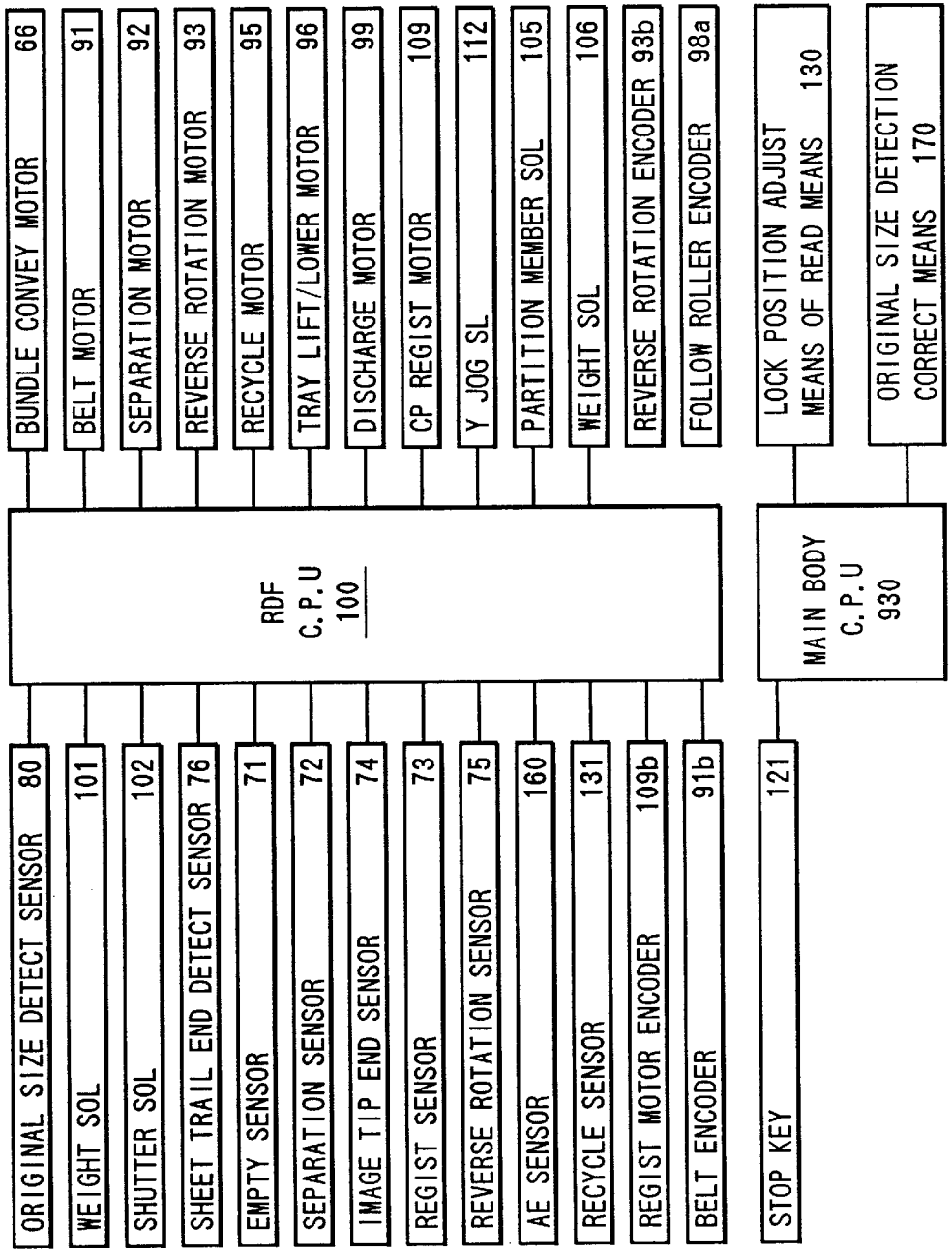
FIG. 10 is a block diagram of a control system of the automatic original feeding apparatus.

FIG. 10 is a block diagram showing the control system of the automatic original feeding device 2. A control device (CPU) 100 of the device 2 is connected to sensors provided in different positions of said apparatus 2. In FIG. 1 there are shown an empty sensor 71 for detecting the presence or absence of the original P on the original stacker 5; a separation sensor 72; a pre-registration sensor 73 for detecting the registered original P; a post-registration sensor 74; an inversion sensor 75 for detecting the original P passing the inversion roller 13; a closed-path separation sensor 42; a registration sensor 48; and a sheet feeding sensor 79.

Figure 11:
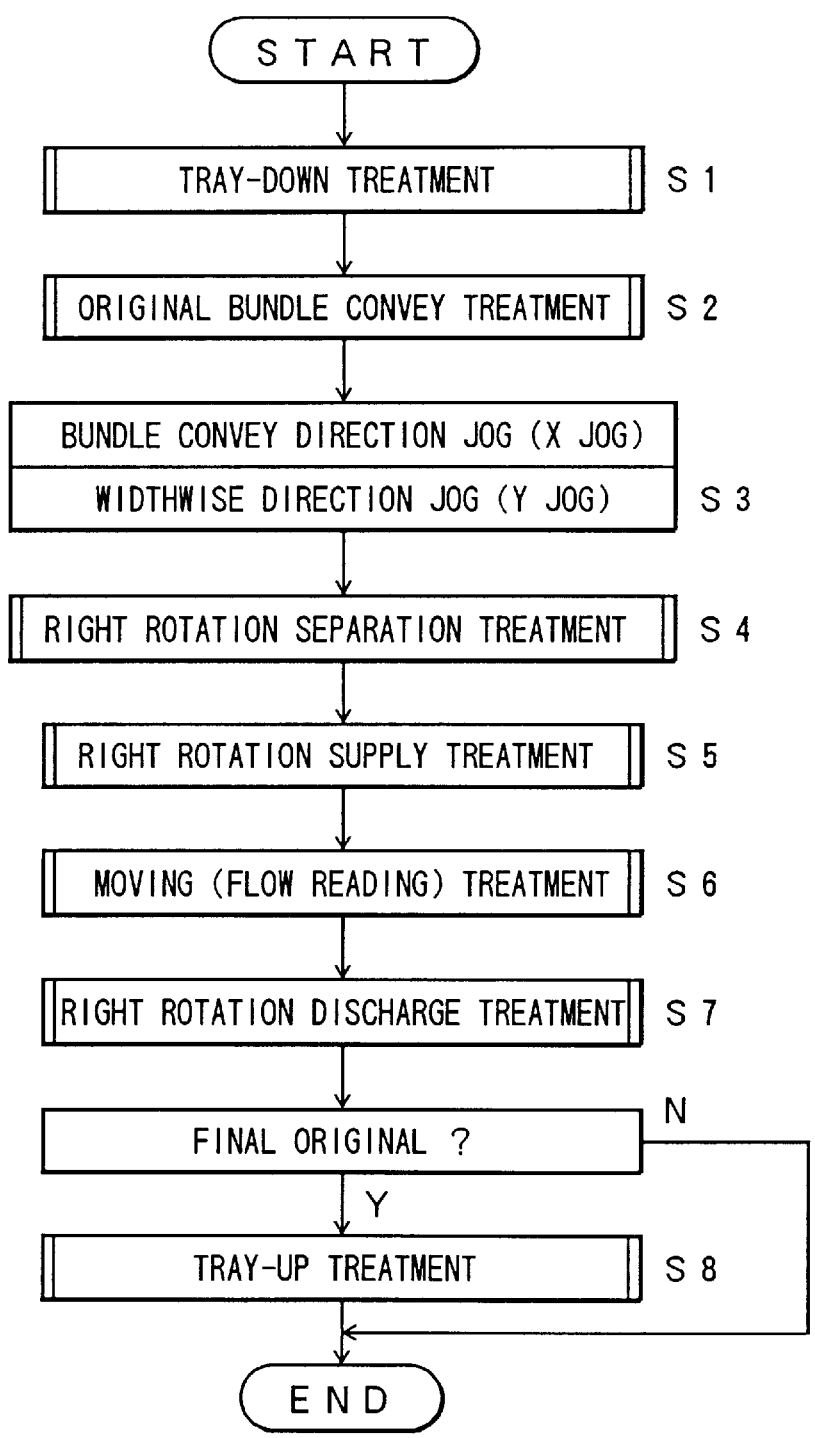
FIG. 11 is a flowchart showing a flow reading mode.

Now there will be explained, with reference to FIG. 11, a flow reading mode in which the original P is subjected to the flow reading operation.

At first the original stacker is moved to the lower limit position (step 1), and the stack of the originals P is moved to the right (step 2). Subsequently jogging operations of the original stack in the stack moving direction (X-jogging) and in the transversal direction (Y-jogging) are executed in succession (step 3), and a clockwise separation is conducted to separate the lowermost original (step 4).

Then an original feeding operation is conducted in order to position an original at the upstream position of the reading position (step 5), and, in response to an original exchange (flow reading start) trigger signal from the main body 900, the flow reading operation is conducted by fixing the optical system 133 of the main body 900 at a predetermined position and conveying the original P with a predetermined speed to a predetermined position (step 6). Subsequently a clockwise sheet discharge is conducted to discharge the original onto the original stacker (step 7).

In the course of the clockwise separation process (step 4), there is discriminated whether the original is the last one as will be explained later, and, if not, the separation of a next original is started in the course of the original feeding operation in the step 5 thereby achieving consecutive original feeding. On the other hand, if the original is the last one, the original stacker is lifted to the original position (step 8) after the clockwise original discharge in the step 7.

Also in case of effecting plural image formations after the flow reading operation in the step 6, the control apparatus 100 returns the light source 907 to a home position for fixed image reading, and the fixed image reading operation by the movement of the light source 907 can thereafter be conducted by a desired number of times.

Figure 12:
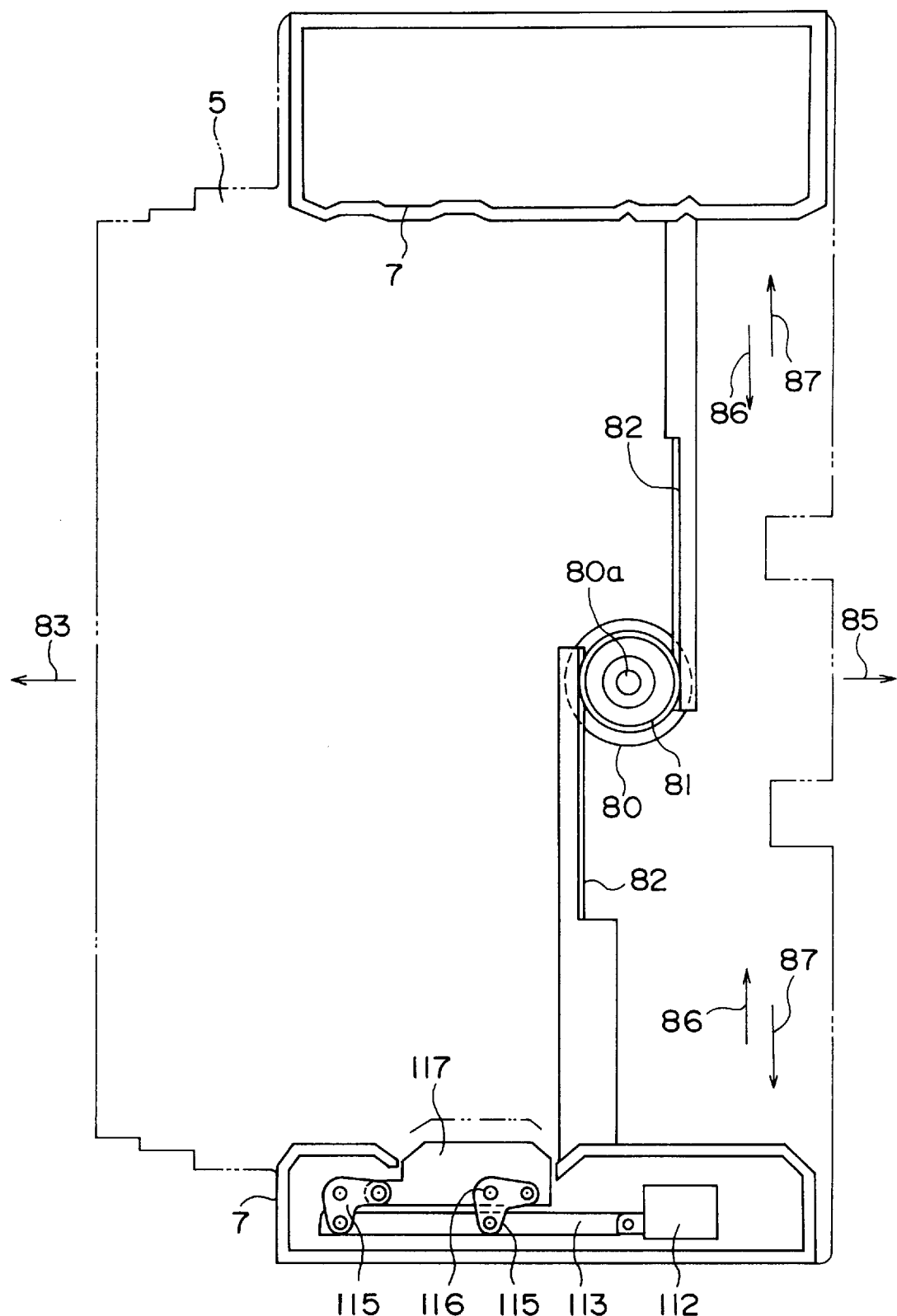
FIG. 12 is a plan view of lateral defining plates and a driving unit therefor.

Now reference is made to FIG. 12 for explaining the driving mechanism for the lateral plates 7.

On both sides of the original stacker 5, there are provided a pair of lateral plates 7, movably in the transversal direction as indicated by arrows 86, 87. At the center of the original stacker 5 there is provided an original size sensor (original size detecting means) 80 consisting of a rotary variable resistor, of which output shaft 80*a* is provided with a pinion 81.

Said pinion 81 meshes, on mutually opposed positions thereof, with a pair of racks 82 which are respectively fixed to the lateral plates 7. Therefore, when the lateral plates 7 are manually so moved to contact the lateral edges of the stacked originals P, the rotary variable resistor 80 is rotated according to the width of said originals P, whereby the size thereof can be automatically detected.

Figure 13:
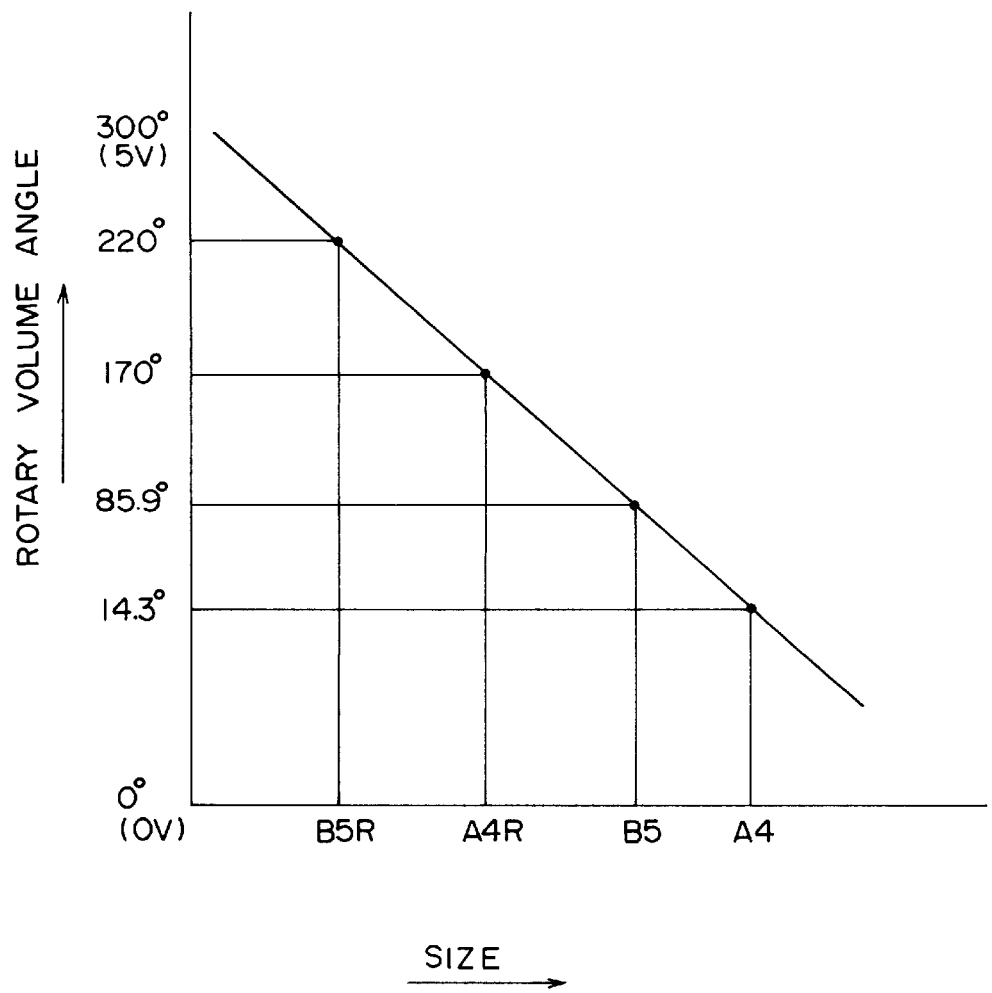
FIG. 13 is a chart showing the relationship between the sheet size and a rotary variable resistor.

FIG. 13 shows the relationship between the size of the originals P stacked on the original stacker 5 and the rotation angle of the rotary variable resistor 80, and, based on this relationship, said size can be detected from said rotation angle.

One of the lateral plates 7 is provided with a side jogging (Y-jog) solenoid 112 connected to a link lever 113, which is in turn connected to ends of a pair of link members 115. The other ends of said link members 115 are connected to a jogging member 117. Thus, on/off operations of the solenoid 112 cause reciprocating motions of the jogging member 117 in the transversal direction of the original stacker 5, thereby aligning the stacked originals P in said transversal direction.

In the following there will be explained the operations of stack movement, shutter movement and recycle lever movement.

Figure 3:
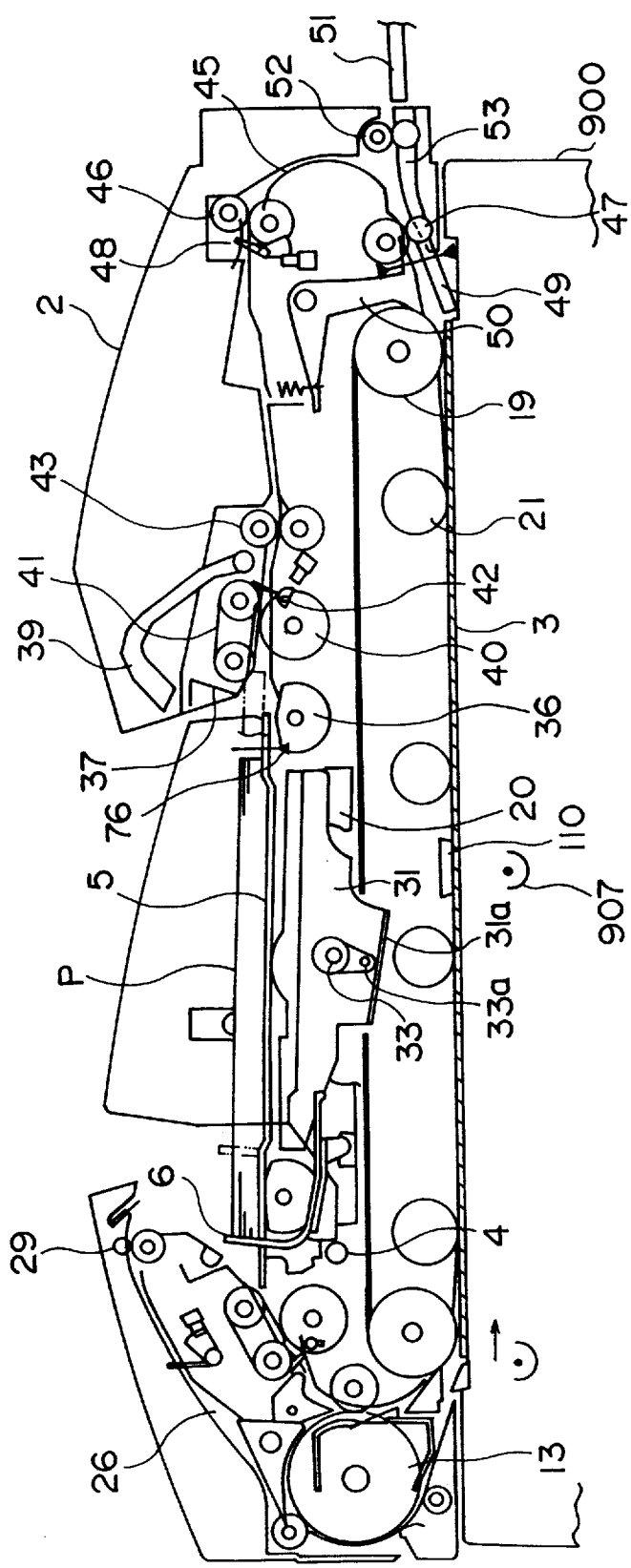
FIG. 3 is a view showing the function of the automatic original feeding apparatus shown in FIG. 1.

In the stack moving process, the stack moving motor 66 is activated to move the stack of the originals P on the original stacker 5 toward the closed path, namely to the right in FIG. 3.

As the size of the originals P stacked on the original stacker 5 is detected in advance by the rotary variable resistor 80, the motor 66 is rotated according to thus detected size to push the stack of the originals P. If the original read end sensor 76 does not yet detect the stack, the rotation of the motor 66 is continued to cause the shutter 6 to move the stack of the originals P to the predetermined position of the feed unit 77.

After the detection of the end of the stack of the originals P by the original rear end sensor 34, the movement of the stack by the shutter 6 is continued for a predetermined distance. In this operation, the moving distance of the stacked originals by the motor 66 is controlled by an internal timer of the CPU-100. Thereafter the motor 66 is turned off to terminate the stack moving process.

As explained in the foregoing, the movement of the stack of the originals P is at first conducted according to the information of the size of said stack, obtained by the rotary variable resistor 80, and is thereafter continued if the stack is still not detected by the original rear end sensor 76, so that even partially cut-off originals can be securely moved to the predetermined position of the feed unit 77 at the closed path side.

The originals P thus moved in stack are fed through the closed path (clockwise feeding) and are subjected to the flow reading operation by the light source 907A fixed at the predetermined position. Immediately before the first one of the originals P subjected to the flow reading is discharged onto the unfed originals on the original stacker 5, the shutter 6 for moving the stack is retracted to the initial position at the side of the switch-back path.

Thus, by retaining the moved stack of the originals P with the shutter 6 until the recycled original is discharged, it is rendered possible to prevent the kick-back phenomenon of the originals toward the switch-back path side, caused by the contact of the moved stack of the original with the separating belt 41 and the defective feeding of the originals P resulting from such phenomenon.

In case, in the course of the above-explained flow reading operation, an abnormality signal indicating an improper state of original feeding is generated, for example if a different original is erroneously placed on the original stacker 5 or if the originals are stapled together, the operator actuates the stop key 121 of the operation panel 120.

In response the feeding of the next original P is suspended, and, after the discharge of the already fed originals P, the shutter 6 effects a jogging operation in the X-direction to align the finally discharged original in contact with the partition member 39B. When the original feeding operation is stopped, the original stacker 5 is maintained in the lowered position.

The above-mentioned abnormality signal is generated also in case of defective feeding of the discharged original P. More specifically, if a discharged original P enters under the partition member 39B, the signal indicating the completion of feeding is not generated even when all the originals P are fed, since the discharged original is detected by the original rear end sensor 76. In such case the feeding operation is terminated by an abnormality signal of the original rear end sensor 76 indicating the defective partition.

In case the feeding operation of the originals P is interrupted as explained in the foregoing, the original stacker 5 is shifted to the lowered position and the finally discharged original P is aligned. It is thus rendered possible to prevent damage to the originals P resulting from the lifting of the original stacker 5 and to facimilate the removal of the originals P from the original stacker 5.

In the following there will be explained the original size detection in the present invention, with reference to FIGS. 14 and 15.

Figure 14:
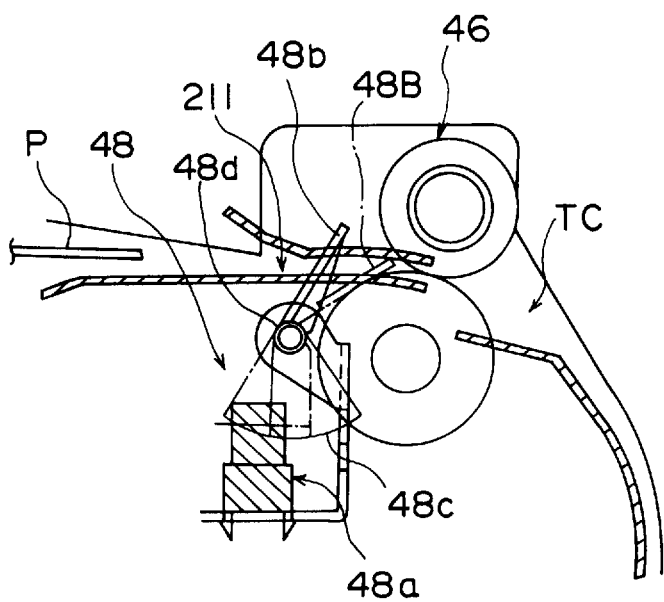
FIG. 14 is a longitudinal cross-sectional view of paired registration roller and a registration sensor in the closed path.

In the closed convey path 211, there are provided, as shown in FIG. 14, paired registration rollers 46 for registering the original P supplied from the original stacker 5. Said registration rollers 46 are driven by the registration motor 109 shown in FIG. 9, and the amount of rotation is measured by the number of clock signals from the CP registration motor encoder (original size detection means) 109*b*.

The length of the original P conveyed by the registration rollers 46 is measured from the number of clock signals of said encoder 109*b* and the peripheral length of the registration rollers 46. At the upstream side of said registration rollers 46 there is provided a registration sensor 48 for detecting the front and rear ends of the conveyed original P, and a sensor lever 48b constituting the actuator of said sensor extends in the convey path 211 and is rotated in the forward or reverse direction by the front or rear end of the conveyed original P.

The original P fed from the original stacker 5 and conveyed in the path 211 moves, by the front end thereof, the sensor lever 48b to a position 48B. This rotation of the sensor lever 48b turns on the registration sensor 48, and it is turned off when the rear end of the original P leaves the sensor lever 48b, whereby signals are generated corresponding to the passing of the front and rear ends of the original P.

In response to the signal when the registration sensor 48 is turned on, there is initiated the counting of the number of rotations of the registration rollers 46, by the CP registration encoder 109b, and said counting is terminated in response to the signal generated when the sensor 48 is turned off. Thus the counting time for the number of rotations of the registration rollers 46 by the CP registration motor encoder 109b is controlled by the registration sensor 48. The distance between the front and rear ends of the original P, or the size thereof, conveyed by the registration rollers 46, is detected from the count of said encoder 109b and the peripheral length of the registration rollers 46.

In the closed path, there are provided at least two conveying speeds for the original P. Though the returning time of the sensor lever 48b to the initial position, after leaving the rear end of the original P, is constant, the traveling distance of said rear end after leaving the sensor lever 48b varies depending on the conveying speed of the original P. Consequently, in case the original P is conveyed at a high speed in the convey path 211, the rear end of the original P when the registration sensor 48 is turned off by the sensor lever 48b, i.e. when the counting of the number of rotations of the registration rollers 46 by the CP registration motor encoder 109b is terminated, travels a larger distance to the downstream side, in comparison with the rear end of the original conveyed at a lower speed, so that the size of the original P is detected longer than the actual size.

In order to prevent such a drawback, the count of the CP registration motor encoder 109b is corrected by the original size correction means 170 (FIG. 10) with a correcting rectified value according to the conveying speed of the original P.

Figure 15:
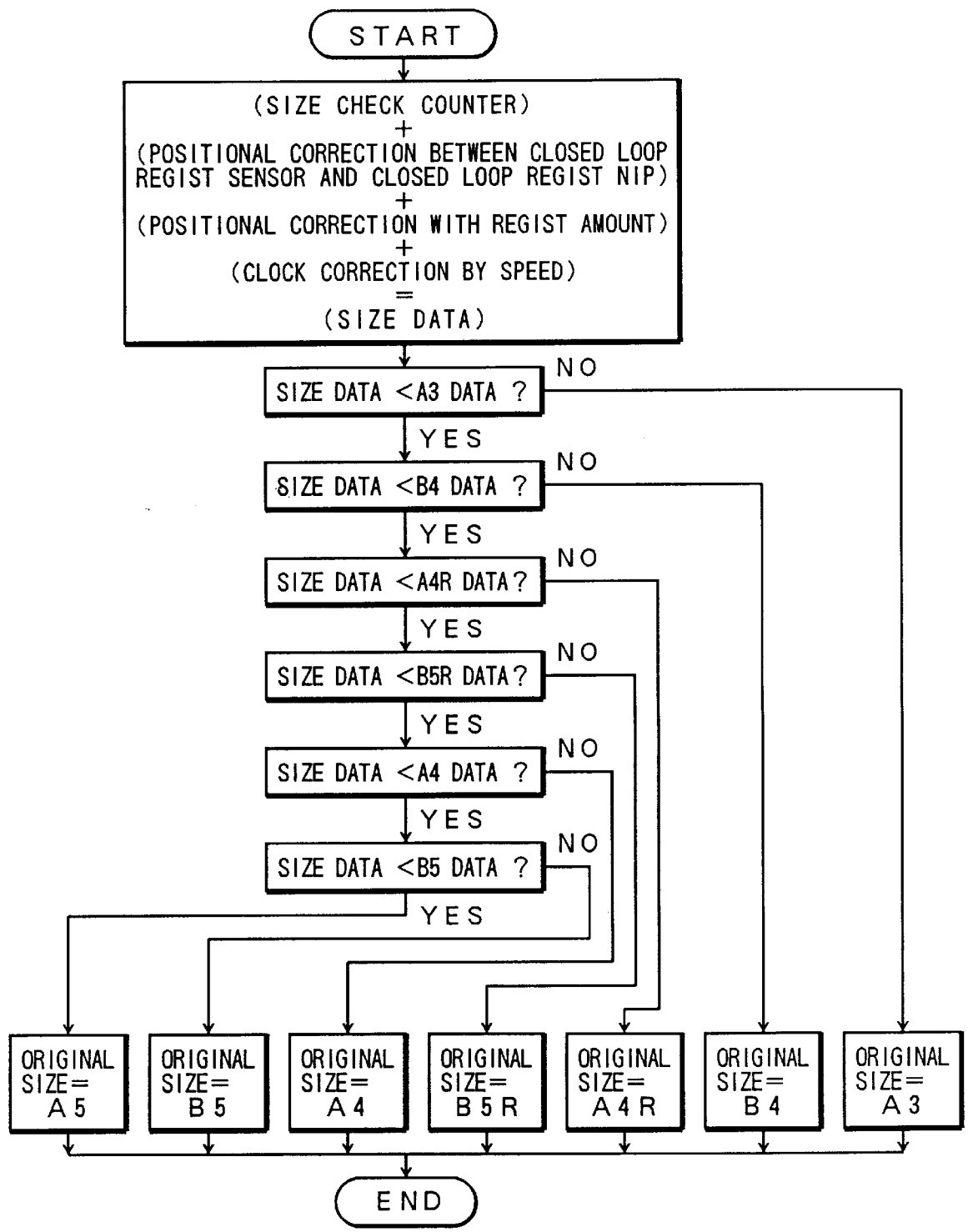
FIG. 15 is a flowchart showing the function of a size checking counter in the closed path.

FIG. 15 shows a flowchart for the size checking process in the closed path.

At first the belt motor 91 and the inversion motor 93 (FIG. 9) are activated to feed the original P into the closed path, and there is simultaneously activated a size check counter (not shown) for counting the clock signals entered from the inversion motor encoder 93b.

A correct count can be obtained if the rear end of the original passes the rollers simultaneous with the turning-off of the detection switch, induced by the passing of the rear end of the original through the arm. If the switch is not turned off after the passing of the rear end of the original through the rollers, the number of pulses counted thereafter until the turning-off of the detection switch is the error, and such number of pulses is measured in advance in relation to the conveying speed. Thus, the sheet size is measured by subtracting such error number of pulses from the actually counted number of pulses, depending on the conveying speed.

The real size of the original P is obtained by correcting the count of the size check counter in consideration of the distance from the nip position of the registration rollers 46 to the registration sensor 48 in the close path, the amount of pre-feeding in the clockwise separation process (i.e. the amount of pre-feeding by the rollers 46 for waiting after such pre-feeding, said amount being variable in relation to the position of the preceding original) and the correction for the count of the CP registration motor encoder 109b in relation to the conveying speed of the original P as explained above.

In this state the original P is conveyed by the registration rollers 46, and its feed amount securely coincides with the correcting rectified value for the count of the CP registration motor encoder 109b.

Thus, the document size such as A5, B5, A4, B5R, A4R, B4 or A3 can be judged from thus corrected size data.

As explained in the foregoing, in an apparatus for detecting the front and rear ends of the original P by the sensor lever 48b of the mechanical registration sensor 48, the detection error in the original size appearing according to the conveying speed of the original document P is corrected by the detected original size correcting means 170, so that the size of the conveyed original can be exactly detected. The amount of correction for the original size by the correction means 170 is determined, based on an experimentally measured value.

What is claimed is:

1. A sheet size detecting apparatus comprising:
   a rotary member for conveying a sheet;
   rotation detecting means rotating together with said rotary member for generating pulses;
   arm means provided proximate to said rotary member to effect reciprocal rocking by passing of the front end and the rear end of the sheet; and
   control means for measuring an apparent size of the sheet by counting the pulses generated by said rotation detecting means in response to the rocking of said arm means, and adding a correcting rectified value to a measured apparent size according to a conveying speed of the sheet to get an actual size of the sheet.

2. A sheet size detecting apparatus according to claim 1, wherein said rotation detecting means includes a rotary plate having slits thereon and an encoder for counting the number of slits, and said control means measures a size of the sheet from the peripheral length of said rotary member and the measured number of the slits.

3. A sheet size detecting apparatus according to claim 1, wherein said control means includes switch means to be turned on and off respectively by a forward motion and a reverse motion of said arm means, and a number of pulses is counted within a period from turning-on to turning-off of said switch means.

4. A sheet size detecting apparatus according to claim 3, wherein said control means corrects a measured number of pulses, based on a correction value determined in advance according to the conveying speed of the sheet.

5. A sheet size detecting apparatus according to claim 3 if the rear end of the sheet passes said rotary member simultaneously with the turning-off of the switch means caused by release of the arm means from the rear end of the sheet, no rectification is added.

6. A sheet size detecting apparatus according to claim 5, wherein, if said switch means is not turned off even after the rear end of the sheet passes said rotary member, the number of pulses counted thereafter until the turning-off of said switch means is an error, and the number of pulses is measured in advance in correspondence with the conveying speed of the sheet.

7. A sheet size detecting apparatus according to claim 6, wherein said control means measures the size of the sheet by adding a correcting rectification for subtraction of the number of pulses of the error from the actually measured number of pulses.

8. A sheet size detecting apparatus according to claim 7, wherein said rotary member conveys the sheet by plural predetermined speeds, among which one speed is selected according to a mode.

9. A sheet size detecting apparatus according to claim 8, wherein said rotary member stops, after conveying the sheet by a small amount, and then conveys the sheet again.

10. A sheet size detecting apparatus according to claim 7, wherein said control means measures the actual sheet size and determines a kind of the sheet by comparison with size data of various sheets stored in advance.

11. A sheet size detecting apparatus according to claim 10, wherein the kind of sheet is a rated size such as A4, B5, and the like.

12. A sheet size detecting apparatus according to claim 7, wherein said rotation detecting means includes a rotary plate having slits thereon and an encoder for counting the number of slits, and said control means measures a size of the sheet from the peripheral length of said rotary member and the measured number of the slits.

13. A sheet size detecting apparatus according to claim 1, wherein said control means measures the actual sheet size by judgment of size data, and determines a kind of the sheet by comparison with size data of various sheets stored in advance.

14. A sheet size detecting apparatus according to claim 1, wherein said rotary member conveys the sheet by plural predetermined speeds, among which one speed is selected according to a mode.

15. A sheet size detecting apparatus according to claim 14, wherein said rotary member stops, after conveying the sheet by a small amount, and then conveys the sheet again.

16. A sheet size detecting apparatus comprising:
   a rotary member for conveying a sheet;
   a pulse generating means rotating together with and synchronous with said rotary member for generating pulses;
   an arm means provided proximate to said rotary member to effect a reciprocal rocking by passing of the front end and the rear end of the sheet; and
   control means for measuring an apparent size of the sheet by counting pulses generated by a pulse generating means in response to the rocking of said arm means, and adding a correcting rectification to a measured apparent size according to a conveying speed of the sheet to get an actual size of the sheet,
   wherein said control means includes a switching means to be turned on and off respectively by a forward motion and a reverse motion of said arm means, and a number of pulses is counted within a period from the turn-on to turn-off of said switch means.

17. A sheet size detecting apparatus according to claim 16, wherein said control means corrects a measured number of pulses, based on a correction value determined in advance according to the conveying speed of the sheet.

18. A sheet size detecting apparatus according to claim 16, wherein, if the rear end of the sheet passes said rotary member simultaneously with the turning-off of the switch means caused by release of the arm means from the rear end of the sheet, no rectification is added.

19. A sheet size detecting apparatus according to claim 18, wherein if said switch means is not turned off even after the rear end of the sheet passes said rotary member, the number of the pulses counted thereafter until the turning-off of said switch means is an error number, and the number of pulses is measured in advance in correspondence with the conveying speed of the sheet.

20. A sheet size detecting apparatus according to claim 19, wherein said control means measures the size of the sheet by subtraction of the number of pulses corresponding to the error from the actually measured number of pulses.

21. An automatic original feeding apparatus having sheet size detecting apparatus comprising:
   a rotary member for conveying a sheet;
   rotation detecting means rotating together with said rotary member for generating pulses;
   arm means provided proximate to said rotary member to effect reciprocal rocking by passing of the front end and the rear end of the sheet; and
   control means for measuring an apparent size of the sheet by counting the pulses generated by said rotation detecting means in response to the rocking of said arm means, and adding a correcting rectification to a measured apparent size according to a conveying speed of the sheet to get an actual size of the sheet.

22. An automatic original feeding apparatus according to claim 21, wherein said rotation detecting means includes a rotary plate having slits thereon and an encoder for counting the number of slits, and said control means measures a size of the sheet from the peripheral length of said rotary member and the measured number of the slits.

23. An automatic original feeding apparatus according to claim 21, wherein said control means includes switch means to be turned on and off respectively by a forward motion and a reverse motion of said arm means, and a number of pulses is counted within a period from turning-on to turning-off said switch means.

24. An automatic original feeding apparatus according to claim 23, wherein said control means corrects a measured number of pulses, based on a correction value determined in advance according to the conveying speed of the sheet.

25. An automatic original feeding apparatus according to claim 23, wherein, if the rear end of the sheet passes said rotary member simultaneously with the turning-off of the switch means caused by release of the arm means from the rear end of the sheet, no correcting rectification is added.

26. An automatic original feeding apparatus according to claim 25, wherein if said switch means is not turned off even after the rear end of the sheet passes said rotary member, the number of pulses counted thereafter until the turning-off of said switch means is an error number, and the number of pulses is measured in advance in correspondence with the conveying speed of the sheet.

27. An automatic original feeding apparatus according to claim 26, wherein said control means measures the size of the sheet by subtraction of the number of pulses corresponding to the error number from the actually measured number of pulses.

28. An automatic original feeding apparatus according to claim 27, wherein said rotary member conveys the sheet by plural predetermined speeds, among which one speed is selected according to a mode.

29. An automatic original feeding apparatus according to claim 38, wherein said rotary member stops, after conveying the sheet by a small amount, and then conveys the sheet again.

30. An automatic original feeding apparatus according to claim 27, wherein said control means measures the actual sheet size and determines kind of the sheet by comparison with size data of various sheets stored in advance.

31. An automatic original feeding apparatus according to claim 30, wherein the kind of sheet is a rated size such as A4, B5, and the like.

32. An automatic original feeding apparatus according to claim 27, wherein said rotation detecting means includes a rotary plate having slits thereon and an encoder for counting the number of slits, and said control means measures a size of the sheet form the peripheral length of said rotary member and the measured number of the slits.

33. An automatic original feeding apparatus according to claim 21, wherein said control means measures the actual sheet size and determines a kind of the sheet by comparison with size data of various sheets stored in advance.

34. An automatic original feeding apparatus according to claim 21, wherein said rotary member conveys the sheet by plural predetermined speeds, among which one speed is selected according to a mode.

35. An automatic original feeding apparatus according to claim 34, wherein said rotary member stops, after conveying the sheet by a small amount, and then conveys the sheet again.

* * * * *

UNITED STATES PATENT AND TRADEMARK OFFICE
CERTIFICATE OF CORRECTION

PATENT NO. : 5,875,033

DATED : February 23, 1999

INVENTOR(S) : WATARU KAWATA, ET AL.

It is certified that error appears in the above-identified patent and that said Letters Patent is hereby corrected as shown below:

COLUMN 1,
Line 63, "speed," should read --speeds,--.

COLUMN 2,
Line 22, "measuring-the" should read --measuring the--.

COLUMN 3,
Line 47, "view-of" should read --view of--.

COLUMN 4,
Line 6, "one by" should read --one-by--; and
Line 7, "by-means" should read --by means--.

COLUMN 5,
Line 7, "pair" should read --pair of--, and "of" should be deleted.

COLUMN 6,
Line 21, "discussion" should read --discussion,--.

COLUMN 8,
Line 18, "original" should be deleted.

UNITED STATES PATENT AND TRADEMARK OFFICE
CERTIFICATE OF CORRECTION

PATENT NO. : 5,875,033

DATED : February 23, 1999

INVENTOR(S) : WATARU KAWATA, ET AL.

It is certified that error appears in the above-identified patent and that said Letters Patent is hereby corrected as shown below:

COLUMN 9,
Line 66, "CPU-100." should read --CPU 100.--.

COLUMN 10,
Line 51, "facimilate" should read --facilitate--.

COLUMN 12,
Line 59, "3 if" should read --3, wherein, if--.

COLUMN 14,
Line 65, "claim 38" should read --claim 28,--.

COLUMN 15,
Line 12, "form" should read --from--.

Signed and Sealed this

Ninth Day of November, 1999

Q. TODD DICKINSON

*Attest:*

*Attesting Officer*   Acting Commissioner of Patents and Trademarks